(12) United States Patent
Carnes

(10) Patent No.: US 8,333,358 B2
(45) Date of Patent: Dec. 18, 2012

(54) FISHING ROD HOLDER DEVICE AND ASSOCIATED METHODS

(76) Inventor: Jim Carnes, Merritt Island, FL (US)

( * ) Notice: Subject to any disclaimer, the term of this patent is extended or adjusted under 35 U.S.C. 154(b) by 438 days.

(21) Appl. No.: 12/565,917

(22) Filed: Sep. 24, 2009

(65) Prior Publication Data

US 2010/0072338 A1    Mar. 25, 2010

Related U.S. Application Data

(60) Provisional application No. 61/099,983, filed on Sep. 25, 2008.

(51) Int. Cl.
*F16M 13/00* (2006.01)

(52) U.S. Cl. ......... 248/518; 248/534; 248/535; 43/21.2; 43/25.2; 43/25; 224/197; 224/219; 224/222

(58) Field of Classification Search ............. 248/229.17, 248/230.8, 518, 535, 214, 523, 525, 534, 248/205.2; 43/21.2, 25.2, 25, 16, 4; 224/218, 224/197, 219, 222, 922
See application file for complete search history.

(56) References Cited

U.S. PATENT DOCUMENTS

| | | | |
|---|---|---|---|
| 1,198,202 A | 9/1916 | Drinkard | |
| 1,459,438 A | 6/1923 | Brand | |
| 2,576,624 A | 11/1951 | Miller | |
| 2,840,330 A | 6/1958 | Minton | |
| 3,273,766 A * | 9/1966 | Cosentino | 224/197 |
| 3,550,824 A * | 12/1970 | Bohanski | 224/197 |
| 3,628,759 A | 12/1971 | Knedlik et al. | 248/42 |
| 3,979,852 A | 9/1976 | Johnson | 43/16 |
| 4,063,704 A | 12/1977 | Rother | 248/515 |
| 4,097,017 A | 6/1978 | Hazlitt | 248/515 |
| 4,658,533 A * | 4/1987 | Mendoza | 43/21.2 |
| 4,759,963 A | 7/1988 | Uso, Jr. et al. | 428/100 |
| 4,763,435 A | 8/1988 | Deering | 43/21.2 |
| 4,896,465 A | 1/1990 | Rhodes et al. | 51/391 |
| 4,901,970 A * | 2/1990 | Moss et al. | 248/514 |
| 5,159,775 A | 11/1992 | Sutula, Jr. | 43/21.2 |
| 5,214,874 A | 6/1993 | Faulkner | 43/25.2 |
| 5,697,183 A | 12/1997 | Walker | 43/21.2 |
| 5,956,883 A | 9/1999 | Krouth et al. | 43/21.2 |
| 6,003,746 A | 12/1999 | Richardson | 224/200 |
| 6,138,976 A * | 10/2000 | Fahringer, Sr. | 248/518 |
| 6,360,928 B1 * | 3/2002 | Russo | 224/218 |
| 6,591,542 B1 | 7/2003 | Jordan | 43/21.2 |
| 6,672,559 B1 | 1/2004 | Boldia | 248/538 |
| 6,931,782 B1 | 8/2005 | Pitcock | 43/21.2 |
| 7,422,188 B1 * | 9/2008 | Schlosser | 248/535 |
| 7,997,546 B1 * | 8/2011 | Andersen et al. | 248/214 |
| 2005/0005500 A1 | 1/2005 | Howley | 43/21.2 |

* cited by examiner

*Primary Examiner* — Ramon Ramirez
*Assistant Examiner* — Todd M Epps
(74) *Attorney, Agent, or Firm* — Allen, Dyer, Doppelt, Milbrath & Gilchrist, P.A.

(57) ABSTRACT

A fishing rod holder device includes a mounting strap having a center portion and spaced apart end portions extending outwards from the center portion. The center portion has an opening extending therethrough. A pivot extends through the opening of the mounting strap, and has a first end adjacent an underside of the mounting strap and a second end adjacent a topside of the mounting strap. A cradle is coupled to the second end of the pivot and configured to receive a fishing rod. The cradle is rotatable with respect to the mounting strap for positioning the fishing rod in a desired direction. A safety strap is coupled to the cradle for securing the fishing rod within the cradle.

17 Claims, 9 Drawing Sheets

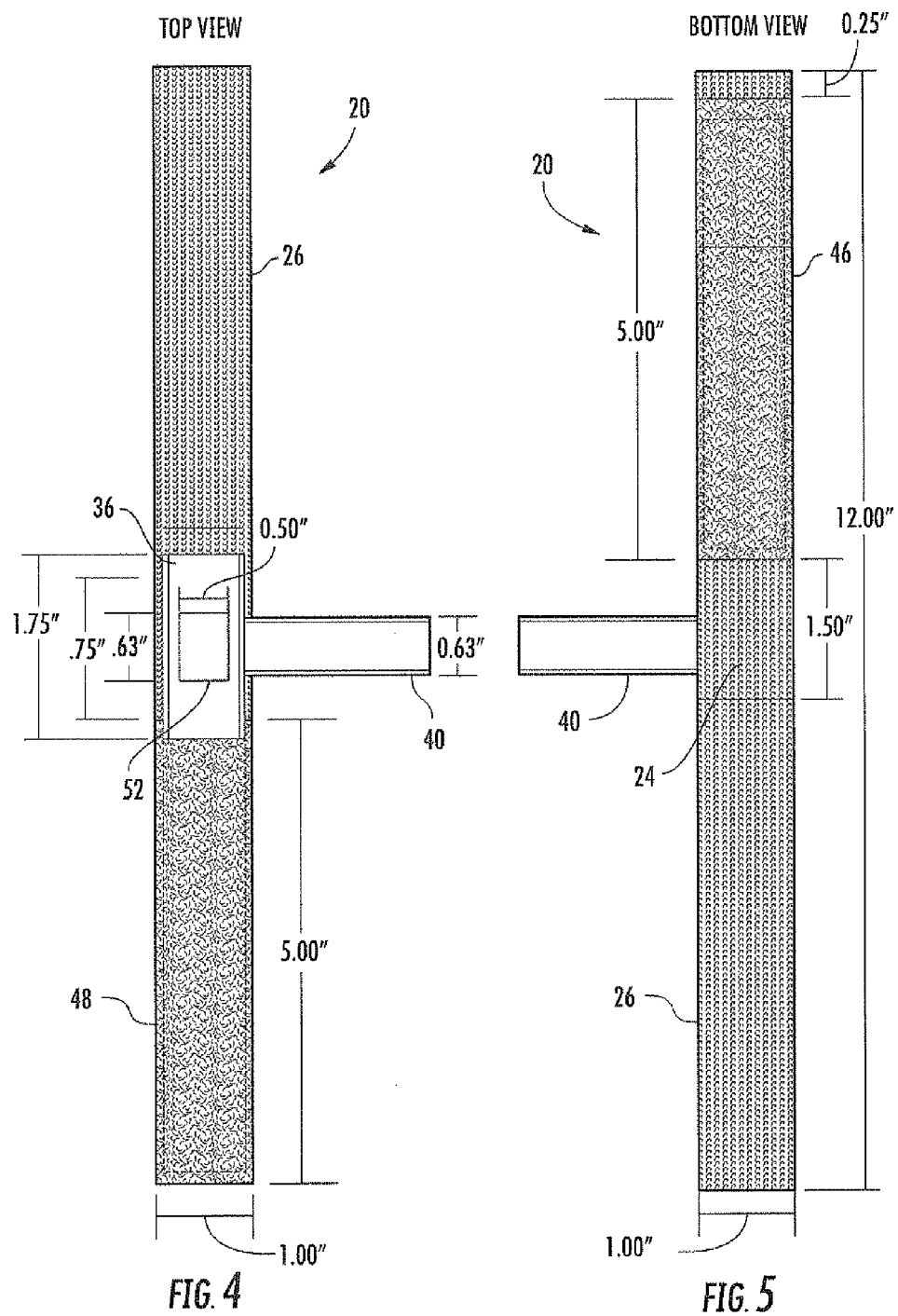

FISHING ROD HOLDER DEVICE AND ASSOCIATED METHODS

RELATED APPLICATIONS

This application claims the benefit of U.S. Provisional Application Ser. No. 61/099,983 filed Sep. 25, 2008, the entire contents of which are incorporated herein by reference.

FIELD OF THE INVENTION

The present invention relates to the field of fishing rods, and more particularly, to a device for holding a fishing rod to a railing on a dock or boat.

BACKGROUND OF THE INVENTION

Fishermen often use more than one fishing rod at the same time or desire to use just one rod while keeping their hands free. However, if a rod is left leaning against a railing on a dock or a boat, it may be pulled into the water if a fish pulls hard on the hook. Even if the rod falls to the ground instead of into the water, the reel may still be damaged. High-end fishing rods are expensive, and there is a demand to protect such equipment from being lost or damaged while in use. Consequently, fishing rod holders have been developed.

Traps and bands have been used to hold a fishing rod in an upright position while unattended on a dock or deck of a boat. For example, U.S. Pat. No. 4,759,963 discloses an adaptable fastening device for fastening fishing rods to railings, which has a quick release function provided by an elasticized band having a Velcro™ fastening mechanism to secure the two ends together. This band is fastened to the railing. A band of non-stretchable material having a Velcro™ fastening mechanism to secure the two ends together is permanently attached crosswise to the elasticized band, closer to one end thereof. This band is then fastened to the fishing rod. A drawback of this approach is that the band of non-stretchable material fastened to the fishing rod interferes with the natural backbone of the rod. This means that the rod could snap if pulled hard enough by a fish.

U.S. Pat. No. 6,931,782 discloses a fishing rod holder for use when fishing with a single or multiple rods. The rod holder has a hollow cylinder shaped body with u-shaped grooves that have been machined into the cylinder for the placement of fishing rods while in use. Two self-adhering straps attach the rod holder to a railing on a dock or boat. The rod holder also has shorter straps that extend over the rod shaft after having been inserted into one of the u-shaped grooves and which hold the rod in place. A drawback of this approach is that the direction or angle of the fishing rod is limited by the direction of the u-shaped grooves in the rod holder.

SUMMARY OF THE INVENTION

In view of the foregoing background, it is therefore an object of the present invention to provide a fishing rod holder device that does not interfere with the natural backbone of the fishing rod while allowing the fishing rod to be positioned in a desired direction.

This and other objects, advantages and features in accordance with the present invention are provided by a fishing rod holder device comprising a mounting strap having a center portion and spaced apart end portions extending outwards from the center portion, with the center portion having an opening extending therethrough. A pivot may extend through the opening of the mounting strap, and has a first end adjacent an underside of the mounting strap and a second end adjacent a topside of the mounting strap. A cradle may be coupled to the second end of the pivot and configured to receive a fishing rod. The cradle may be rotatable with respect to the mounting strap for positioning the fishing rod in a desired direction. A safety strap may be coupled to the cradle for securing the fishing rod within the cradle.

The fishing rod holder device holds a fishing rod in an upright position while unattended on a dock or deck of a boat. An advantage of the cradle is that it holds the fishing rod so as to not interfere with the natural backbone of the rod should a fish suddenly pull hard on the fishing line. In addition, since the cradle can rotate about the pivot, the fishing rod can be positioned in a desired direction while being in the upright position.

The cradle may have an opening extending therethrough for receiving the second end of the pivot. The second end of the pivot may be recessed within the opening. A protective layer may be on the cradle to cover the opening extending through the cradle. This prevents the second end of the pivot from contacting the fishing rod and/or fishing line. The cradle may comprise an elongated u-shaped section. The edges of the elongated u-shaped section may be rounded.

The fishing rod holder device may further comprise an underside reinforcement patch coupled to the underside of the center portion of the mounting strap and overlapping the first end of the pivot. Similarly, the fishing rod holder device may further comprise a topside reinforcement patch coupled to the topside of the center portion of the mounting strap and having an opening therethrough for the pivot. The side edges of the underside and topside reinforcement patches may be hermetically sealed to side edges of the center portion of the mounting strap.

The end portions of the strap may comprise connectors for connecting the end portions to one another around a railing on a boat or dock. The connectors may comprise hook-and-loop fasteners, for example.

Another aspect of the invention is directed to a method for holding a fishing rod against a railing on a boat or dock using a fishing rod holder device as described above. The method may comprise connecting the spaced apart end portions of the strap to one another around the railing on a dock or boat, and rotating the cradle with respect to the mounting strap for positioning the fishing rod in a desired direction. A portion of the fishing rod may then be positioned within the cradle. The method may further comprise securing the fishing rod within the cradle using a safety strap coupled to the cradle.

BRIEF DESCRIPTION OF THE DRAWINGS

FIGS. 4 and 5 are respectively top and bottom views with dimensions of the fishing rod holder device illustrated in FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
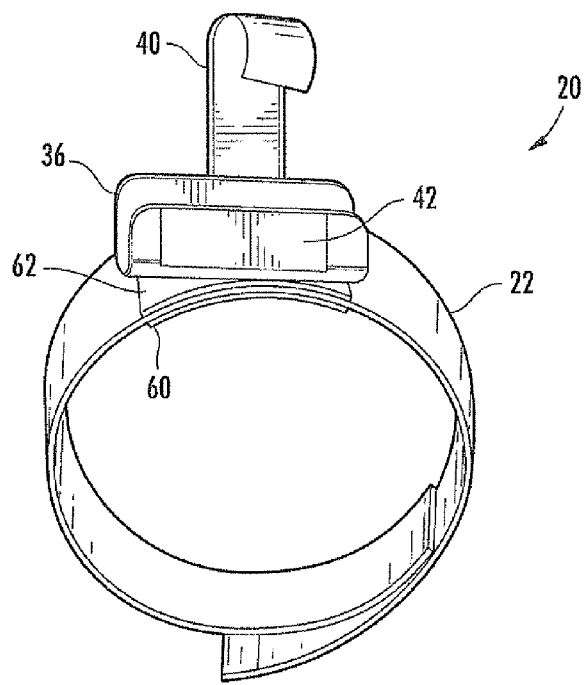
FIG. 1 is a side perspective view of a fishing rod holder device in accordance with the present invention.
Figure 2:
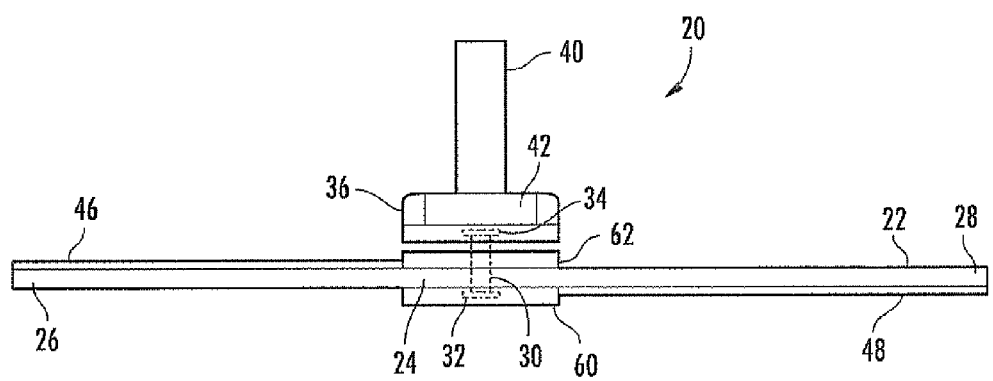
FIG. 2 is a more detailed side view of the fishing rod holder device illustrated in FIG. 1.

Referring initially to FIGS. 1 and 2, the illustrated fishing rod holder device 20 comprises a mounting strap 22 having a center portion 24 and spaced apart end portions 26, 28 extending outwards from the center portion. The center portion 24 has an opening extending therethrough. A pivot 30 extends through the opening of the mounting strap 22, and has a first end 32 adjacent an underside of the mounting strap and a second end 34 adjacent a topside of the mounting strap.

A cradle 36 is coupled to the second end 34 of the pivot 30 and is configured to receive a portion of the fishing rod. The cradle 36 is rotatable with respect to the mounting strap 22 for positioning the fishing rod in a desired direction. A safety strap 40, 42 is coupled to the cradle 36 for securing the fishing rod within the cradle. The cradle 36 may be made out of plastic, for example.

The end portions 26, 28 of the strap 22 respectively comprise connectors 46, 48 for connecting the end portions to one another around a railing on a boat or dock, for example. The connectors 46, 48 may comprise hook-and-loop fasteners, for example, otherwise known as Velcro™. Other types of connector may be used, such as snaps, for example.

The fishing rod holder device 20 holds a fishing rod in an upright position against a railing on a dock or boat while unattended. An advantage of the cradle 36 is that it holds the fishing rod so as to not interfere with the natural backbone of the rod should a fish suddenly pull hard on the fishing line. In addition, since the cradle 36 can rotate about the pivot 30, the fishing rod can be positioned in a desired direction while being in the upright position.

Figure 3:
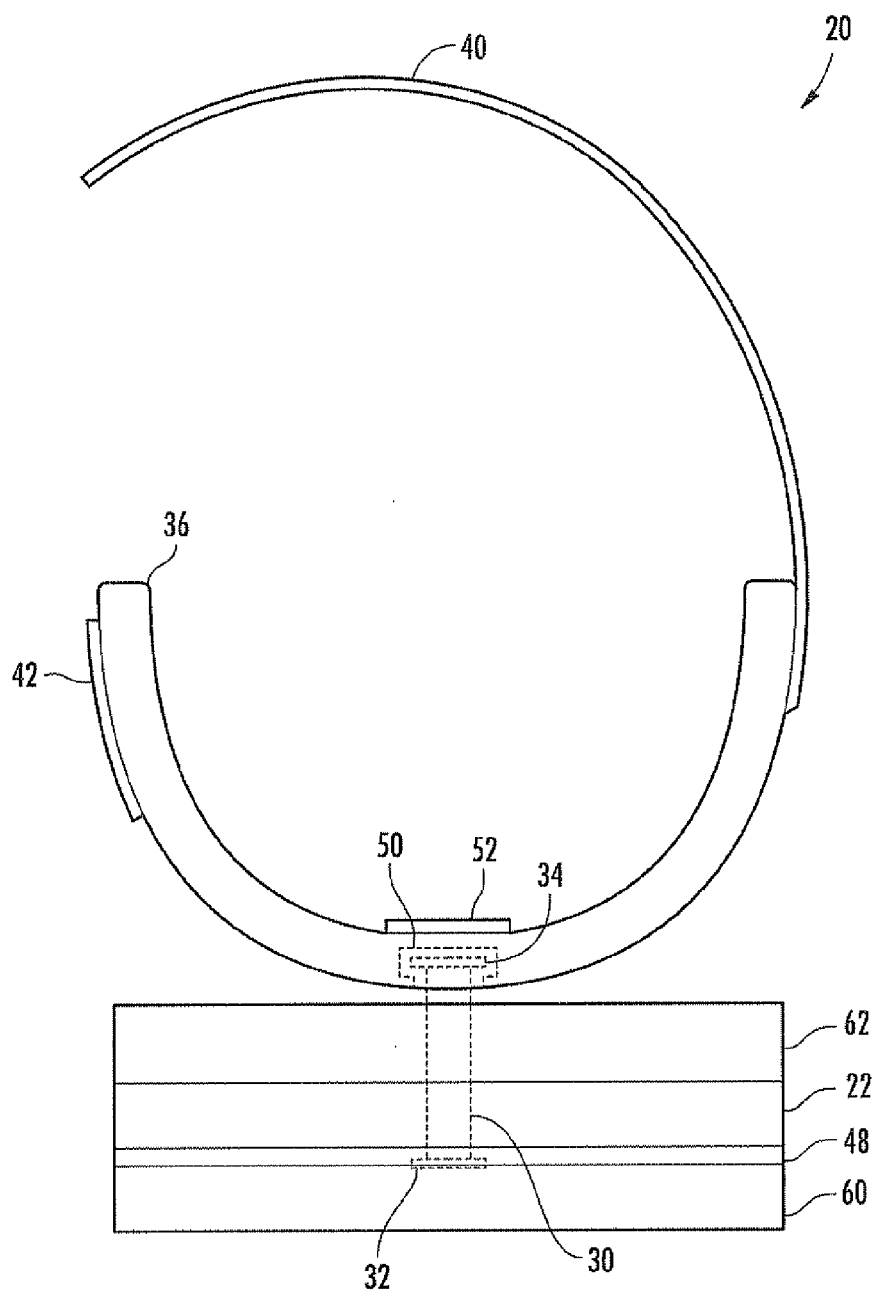
FIG. 3 is a more detailed front view of the fishing rod holder device illustrated in FIG. 1.
Figure 6:
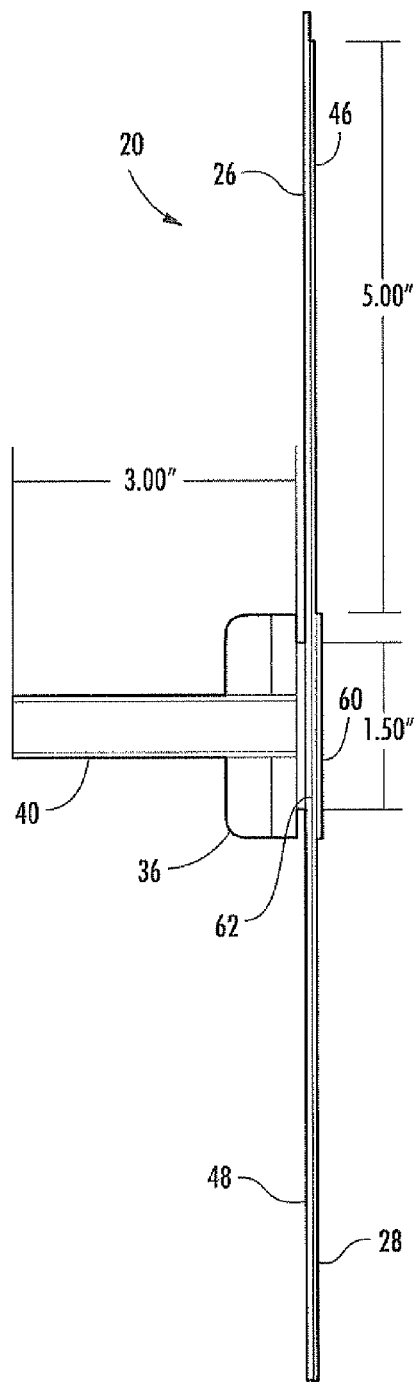
FIGS. 6 and 7 are respectively right and left side views with dimensions of the fishing rod holder device illustrated in FIG. 1.
Figure 7:
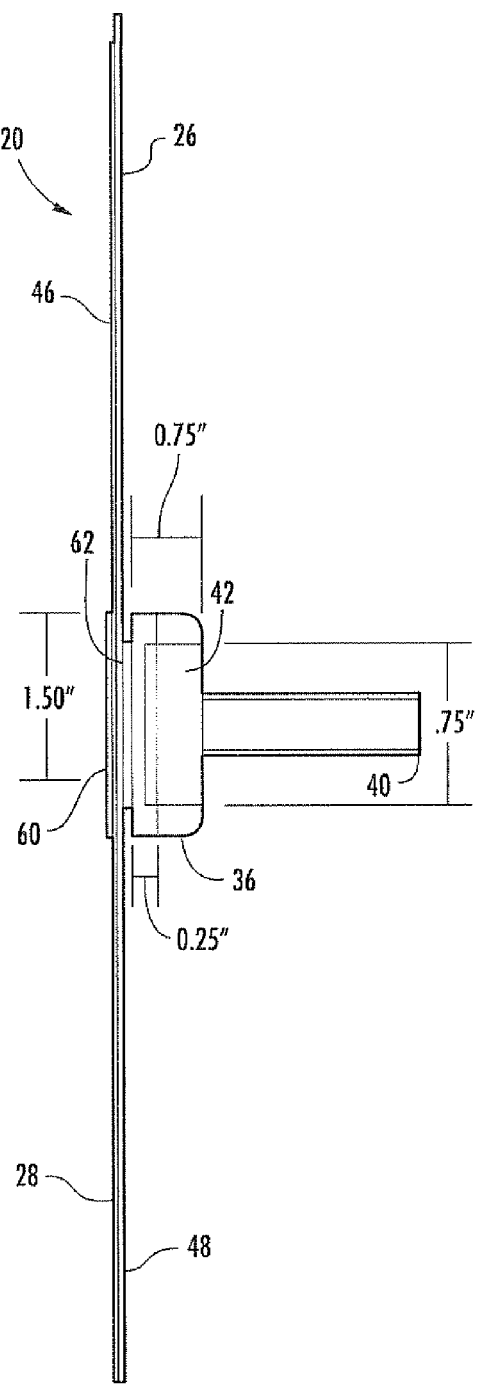

Referring now to FIG. 3, the cradle 36 will be discussed in greater detail. The cradle 36 has an opening 50 extending therethrough for receiving the second end 34 of the pivot 30. The second end 34 of the pivot 30 is recessed within the opening 50. This prevents the fishing rod and/or fishing line from rubbing against the second end 34 of the pivot 30.

The pivot 30 may be a hallow pin, such as a pop rivet, for example. In this case, a sealer may be flowed into the hallow pin to prevent water and/or moisture from contacting the inside of the pin and causing it to rust. If the pivot 30 were to rust, this may prevent the cradle 36 from being rotated. The sealer may be hot glue, for example. To insure a smooth surface over the recessed opening 50 and the second end 34 of the pivot 30, a protective layer 52 is placed on the inside surface of the cradle 36. The protective layer 52 may be tape, for example.

The cradle 36 is configured as an elongated u-shaped section. The edges of the elongated u-shaped section are rounded to reduce resistance with the fishing line sliding therealong. The cradle 36 may be made out of plastic, for example. Preferably, the cradle 36 is resistively held in position once placed in the desired position. This insures that once the cradle 36 is positioned with the fishing rod therein, it will stay in position until re-positioned. In other words, the cradle 36 is held in position by the tension generated by the pivot 30 itself.

The fishing rod holder device 20 may further comprise an underside reinforcement patch 60 coupled to the underside of the mounting strap 22 and overlapping the first end 32 of the pivot 30. Similarly, a topside reinforcement patch 62 may be coupled to the topside of the mounting strap 22 and having an opening therethrough for the pivot 30. The patches 60, 62 advantageously help strengthen the mounting area of the cradle 36.

In addition, the side edges of the underside and topside reinforcement patches 60, 62 may be hermetically sealed to side edges of the center portion 24 of the mounting strap 22. The strap 22 and the underside and topside reinforcement patches 60, 62 may comprise a polyprolene webbing material, and by applying heat to the side edges, they may be hermetically sealed, as readily appreciated by those skilled in the art. Alternatively, the strap 22 and the underside and topside reinforcement patches 60, 62 may comprise other suitable types of material. The hermetic seal advantageously prevents water from contacting the pivot 30, which could cause it to rust.

The safety strap 40, 42 is coupled to the cradle 36 for securing the fishing rod within the cradle. The safety strap 40, 42 may comprise hook-and-loop fasteners, for example, otherwise known as Velcro™. A portion of the strap 40 extends outwards from one side of the cradle 36 and is to be connected to the other portion of the strap 42 that is on an opposite side of the cradle. As an alternative to hook-and-loop fasteners, an elastic strap and hook may be used, for example. Other suitable type straps and connections may be used, as readily appreciated by those skilled in the art.

Referring now to FIGS. 4-7, dimensions are provided for the illustrated fishing rod holder device 20. As readily appreciated by those skilled in the art, the dimensions are for illustration purposes only, and may be sized differently depending on the intended applications.

The strap 22 for the illustrated fishing rod holder device 20 is 12 inches in length and 1 inch in width. The center portion 24 of the strap 22 is 1.5 inches. The cradle 36 is positioned on the center portion 24 and is 1.75 inches in length and 0.75 inches in height. The connectors 46, 48 on the end portions 26, 28 of the strap are 5 inches in length. The safety strap 40 attached to one side of the cradle 36 is 3 inches in length and is 0.63 inches wide. The connector portion 42 of the safety strap 40 is on the opposite side of the cradle 36, and is 0.75 inches in length.

Figure 8:
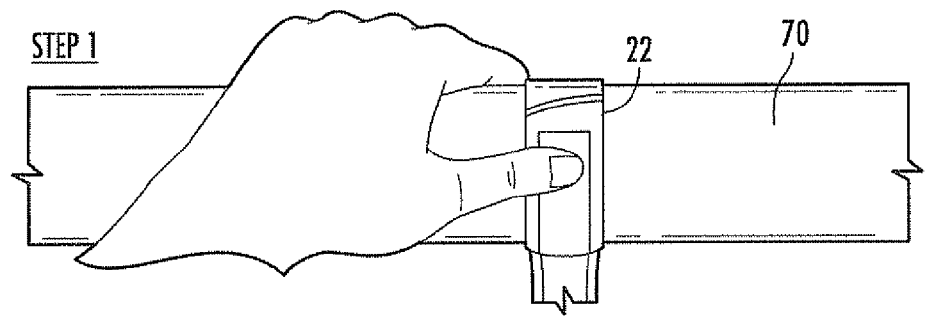
FIGS. 8 through 13 are perspective views illustrating a method for holding a fishing rod against a railing on a boat or dock using the fishing rod holder device illustrated in FIG. 1.
Figure 9:
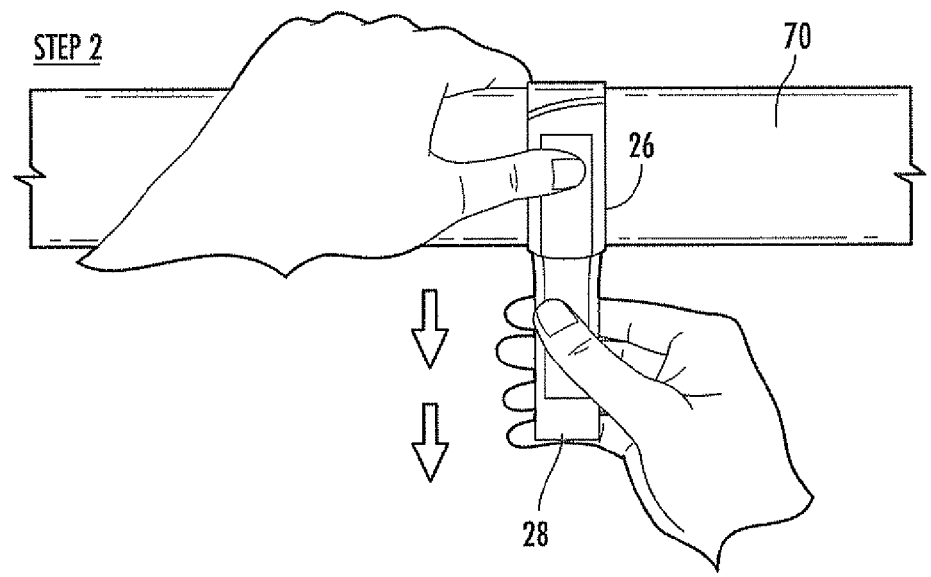
Figure 10:
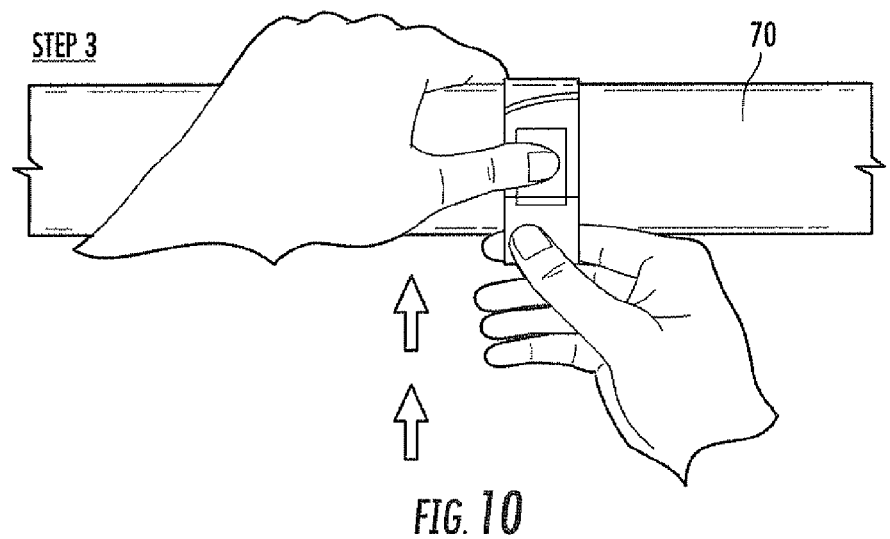

Referring now to FIGS. 8-14, a method for holding a fishing rod 80 against a railing 70 on a boat or dock using the fishing rod holder device 20 will now be discussed. A first step as shown in FIG. 8 is to place the strap 22 around the railing 70. One end portion 26 of the strap 22 is wrapped around the railing 70 as shown in FIG. 9, and the other end portion 28 of the strap 22 is pulled downwards. The two ends 26, 28 of the strap 22 are then connected together as illustrated in FIG. 10.

Figure 11:
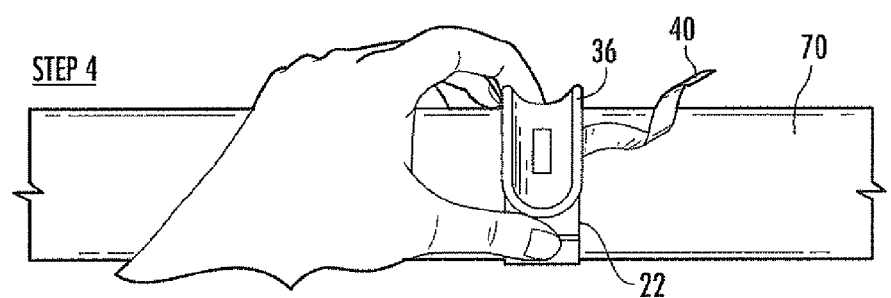
Figure 12:
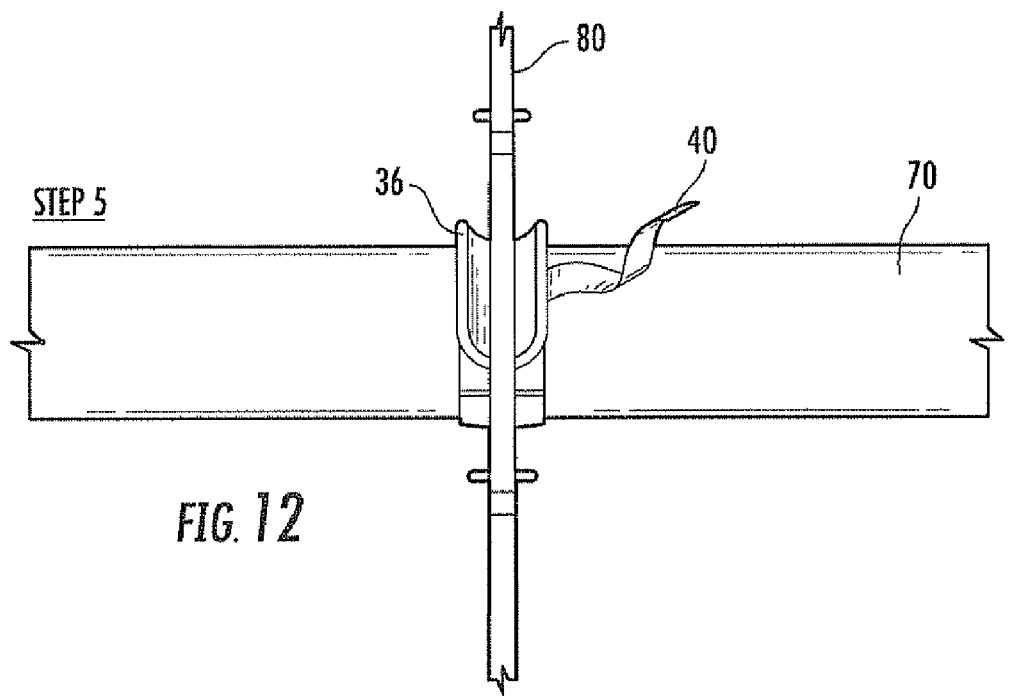
Figure 13:
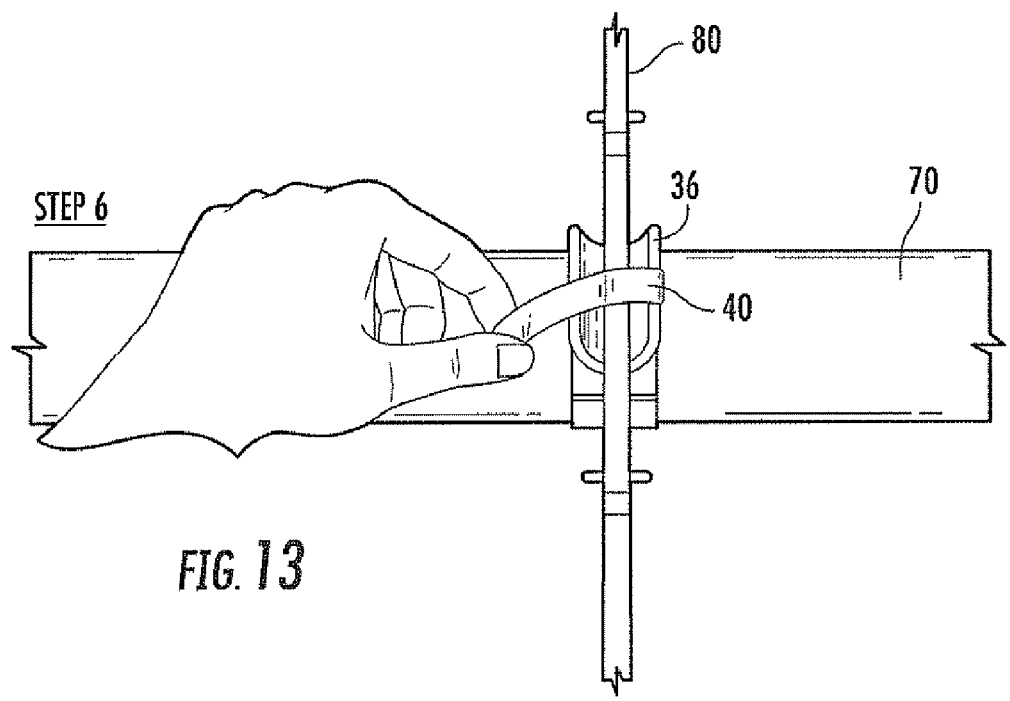
Figure 14:
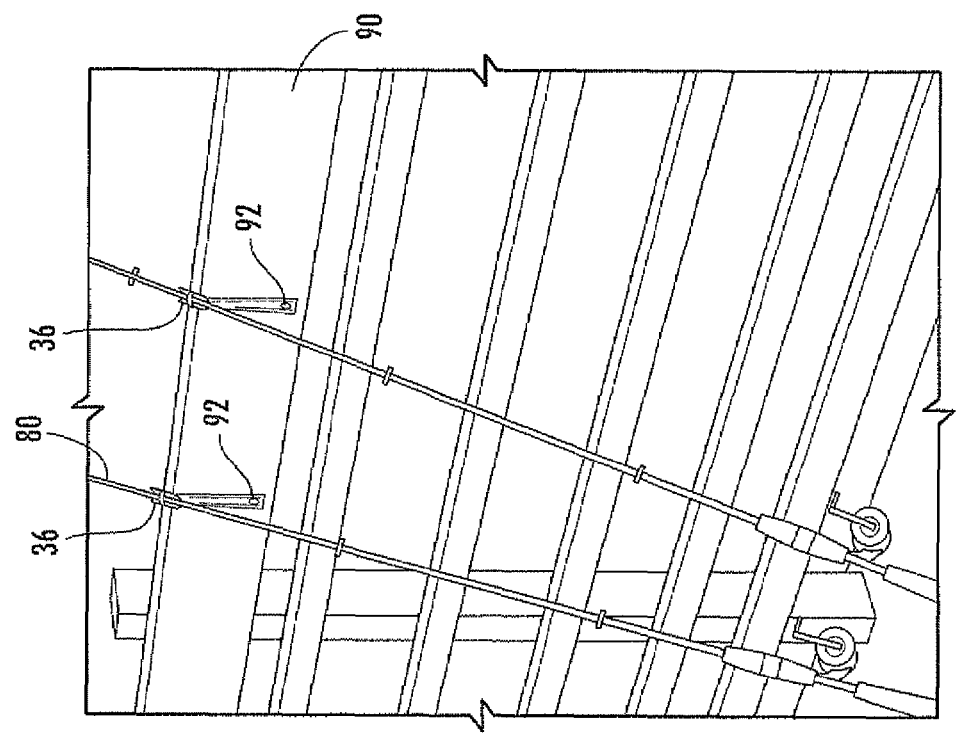
FIG. 14 is a perspective view of multiple fishing rod holder devices holding multiple fishing rods against a railing on a dock in accordance with the present invention.

In the next step, the cradle 36 is rotated with respect to the mounting strap 22 so that the fishing rod 80 will be positioned in a desired direction as illustrated in FIG. 11. A portion of the fishing rod 80 is positioned within the cradle 36 as illustrated in FIG. 12. A next step is to secure the fishing rod 80 within the cradle 36 using a safety strap 40 coupled to the cradle. Once the fishing rod 80 is secured within the cradle 36, other fishing rod holder devices 20 may be positioned on the same railing 70 without the fishing rods 80 interfering with one another as illustrated in FIG. 14.

Figure 15:
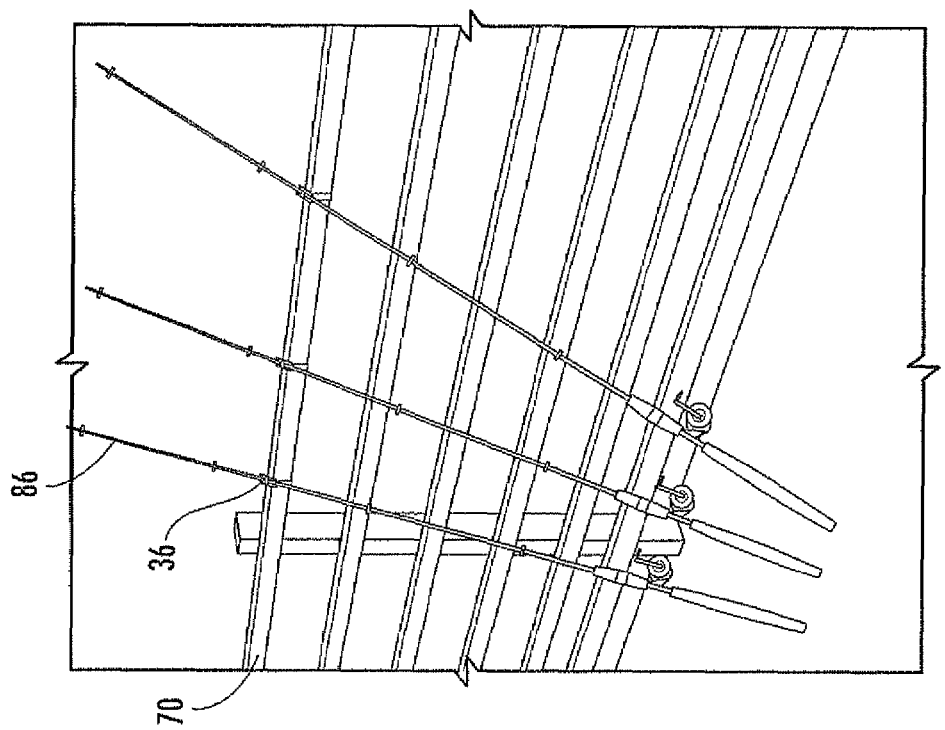
FIG. 15 is a perspective view of the fishing rod holder device mounted to a large wooden railing on a dock using push-pull pins in accordance with the present invention.

For large wooden rails 90, as illustrated in FIG. 15, the strap 22 may be too short in length. In this configuration, push-pull pins 92 are used for securing the end portions 26, 28 of the strap 22 to the wooden railing 90. As an alternative to push-pull pins 92, tacks or other wood penetrating devices may be used.

Although not illustrated, another embodiment of the fishing rod holder device 20 is to use connector extensions for connecting the end portions 26, 28 of the strap 22 to one another around the wooden railing 90 or other large sized railing.

The connector extensions connect to the connector 48 on the underside of the end portion 28 of the strap 22 and to an auxiliary connector mounted on the underside of the end portion 26 of the strap 22. The length of the connector extension is sufficient for the end portions 26, 28 of the strap to be connected together around the large sized railing. The connector extensions may comprise hook and loop fasteners, for example, and allow the strap 22 to extend around the wooden railing 90 so that the connectors on the auxiliary connector can be connected to one another.

Figure 16:
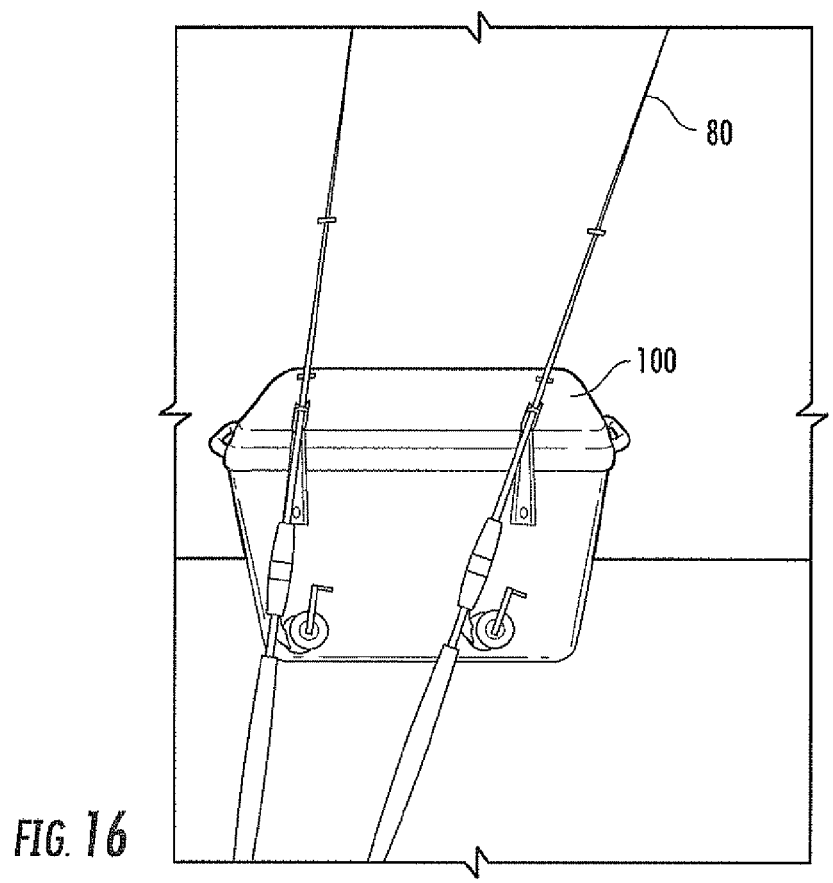
FIG. 16 is a perspective view of the fishing rod holder device mounted to a cooler using auxiliary connectors in accordance with the present invention.
Figure 17:
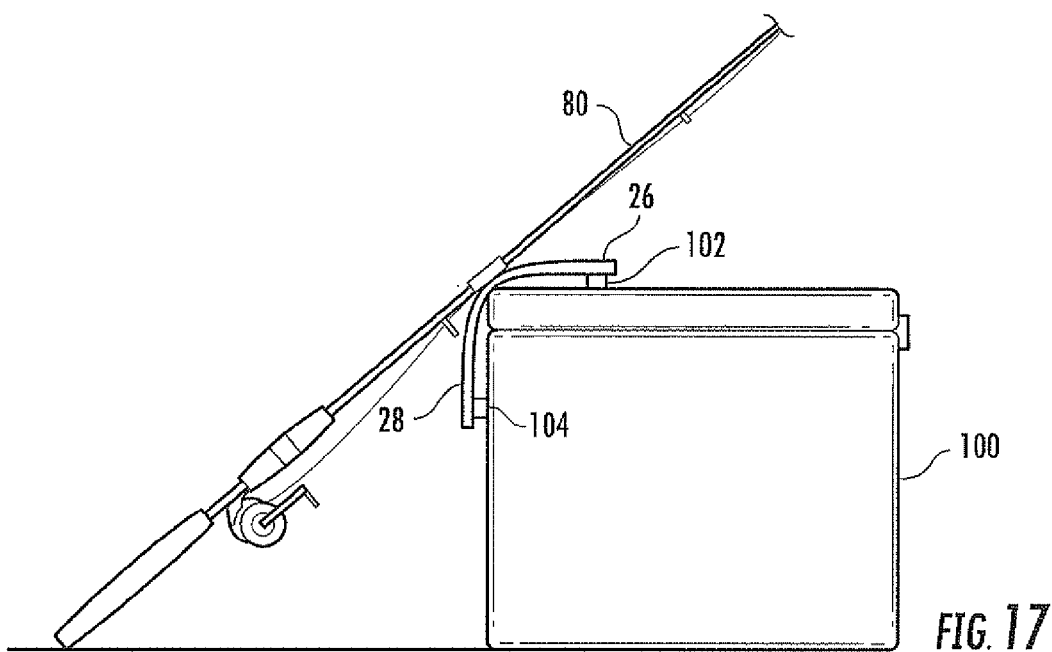
FIG. 17 is a side view of the fishing rod holder device mounted to a cooler using the auxiliary connectors illustrated in FIG. 16.

Similar to the auxiliary connectors discussed above, they may also be used to secure the fishing rod holder device 20 to an object, such as a cooler 100, for example, as illustrated in FIGS. 16 and 17. The auxiliary connector comprises two parts. One part 102 attaches to the cooler 100 and to the underside of the end portion 26 of the strap 22. This part 102 of the auxiliary connector may be further divided into two sections that in turn connect to one another. For example, the connector part 102 may comprise hook and loop fasteners respectively attached to the cooler 100 and to the strap 22.

The other part 104 of the auxiliary connector also attaches between the cooler 100 and the underside of the end portion 28 of the strap 22. Since the underside of the end portion 28 has a connector attached thereto, just one of the hook and loop fasteners is needed for this part 104 of the auxiliary connector.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fishing rod holder device comprising:

a mounting strap having a center portion and spaced apart end portions extending outwards from the center portion, the center portion having an opening extending therethrough;

a pivot extending through the opening of said mounting strap, and having a first end adjacent an underside of said mounting strap and a second end adjacent a topside of said mounting strap;

an underside reinforcement patch coupled to the underside of the center portion of said mounting strap and overlapping the first end of said pivot;

a topside reinforcement patch coupled to the topside of the center portion of said mounting strap and having an opening therethrough for said pivot;

said underside and topside of said reinforcement patches having spaced apart side edges sealed to spaced apart side edges of the center portion of said mounting strap;

a cradle coupled to the second end of said pivot and configured to receive a fishing rod, said cradle being rotatable with respect to said mounting strap for positioning the fishing rod in a desired direction; and a safety strap coupled to said cradle for securing the fishing rod within said cradle.

2. The fishing rod holder device according to claim 1 where said cradle has an opening extending therethrough for receiving the second end of said pivot.

3. The fishing rod holder device according to claim 2 where the second end of said pivot is recessed within the opening.

4. The fishing rod holder device according to claim 3 further comprising a protective layer on said cradle to cover the opening extending through said cradle.

5. The fishing rod holder device according to claim 1 wherein said cradle comprises an elongated u-shaped section.

6. The fishing rod holder device according to claim 5 wherein edges of said elongated u-shaped section are rounded.

7. The fishing rod holder device according to claim 1 wherein the spaced apart side edges of said underside and topside reinforcement patches are hermetically sealed to the spaced apart side edges of the center portion of said mounting strap.

8. The fishing rod holder device according to claim 1 wherein the end portions of said strap comprise connectors for connecting the end portions to one another around a railing on a boat or dock.

9. The fishing rod holder device according to claim 8 wherein said connectors comprise hook-and-loop fasteners.

10. The fishing rod holder device according to claim 1 wherein said pivot comprises a hallow pin; and further comprising a water-resistant sealer within said hallow pin.

11. The fishing rod holder device according to claim 1 further comprising a plurality of push-pull pins for securing the end portions of said strap to a wooden railing on dock.

12. The fishing rod holder device according to claim 1 wherein the end portions of said strap comprise connectors; and further comprising auxiliary connectors to be attached to an object so that the connectors from said strap can be connected thereto.

13. The fishing rod holder device according to claim 1 wherein the end portions of said strap comprise connectors; and further comprising connector extensions for connecting the end portions to one another around a railing on a boat or dock.

14. A method for holding a fishing rod against a railing on a boat or dock using a fishing rod holder device comprising a mounting strap having a center portion and spaced apart end portions extending outwards from the center portion, the center portion having an opening extending therethrough; a pivot extending through the opening of the mounting strap, and having a first end adjacent an underside of the mounting strap and a second end adjacent a topside of the mounting strap; an underside reinforcement patch coupled to the underside of the center portion of the mounting strap and overlapping the first end of said pivot, a topside reinforcement patch coupled to the topside of the center portion of the mounting strap and having an opening therethrough for the pivot, with the underside and topside of the reinforcement patches having side spaced apart edges sealed to spaced apart side edges of the center portion of the mounting strap, and a cradle coupled to the second end of the pivot, the method comprising:
- connecting the spaced apart end portions of the strap to one another around the railing on a dock or boat;
- rotating the cradle with respect to the mounting strap for positioning the fishing rod in a desired direction;
- positioning a portion of the fishing rod within the cradle; and
- securing the fishing rod within the cradle using a safety strap coupled to the cradle.

15. The method according to claim 14 wherein the cradle comprises an elongated u-shaped section so that the positioning comprises positioning the portion of the fishing rod within the elongated u-shaped section.

16. The method according to claim 14 wherein the end portions of the strap comprise connectors so that the securing comprises connecting the end portions to one another around the railing on a boat or dock.

17. The method according to claim 16 wherein the connectors comprise hook-and-loop fasteners so that the connecting comprises the hook-and-loop fasteners directly contacting one another.

* * * * *